US007391938B2

(12) United States Patent
Peyghambarian et al.

(10) Patent No.: US 7,391,938 B2
(45) Date of Patent: Jun. 24, 2008

(54) TECHNIQUE TO ENHANCE THE ELECTRO-OPTIC COEFFICIENT OF POLYMERS BY USING A SOL-GEL CLADDING LAYER TO INCREASE POLING EFFICIENCY

(75) Inventors: Nasser Peyghambarian, Tucson, AZ (US); Robert A. Norwood, Tucson, AZ (US); Christopher T. DeRose, Tucson, AZ (US)

(73) Assignee: The Arizona Board of Regents on behalf of The University of Arizona, Tucson, AZ (US)

( * ) Notice: Subject to any disclaimer, the term of this patent is extended or adjusted under 35 U.S.C. 154(b) by 0 days.

(21) Appl. No.: 11/768,637

(22) Filed: Jun. 26, 2007

(65) Prior Publication Data

US 2007/0297708 A1    Dec. 27, 2007

Related U.S. Application Data

(60) Provisional application No. 60/816,551, filed on Jun. 26, 2006.

(51) Int. Cl.
  *G02B 6/12* (2006.01)
(52) U.S. Cl. .................. 385/14; 385/129; 385/122; 385/130; 385/131; 385/141; 385/143
(58) Field of Classification Search ................ 385/14, 385/129, 130, 131, 132, 122, 141, 143; 65/395
See application file for complete search history.

(56) References Cited

U.S. PATENT DOCUMENTS

| 5,943,464 | A | * | 8/1999 | Khodja | 385/122 |
| 6,033,774 | A | * | 3/2000 | Yitzchaik et al. | 428/333 |
| 6,902,871 | B2 | * | 6/2005 | Dinu et al. | 430/321 |
| 6,937,811 | B2 | | 8/2005 | Bintz et al. | 385/143 |
| 7,206,490 | B2 | | 4/2007 | Bintz et al. | 385/143 |
| 2004/0067449 | A1 | * | 4/2004 | Dinu et al. | 430/321 |

* cited by examiner

*Primary Examiner*—Brian M Healy
(74) *Attorney, Agent, or Firm*—Oblon, Spivak, McClelland, Maier & Neustadt, P.C.

(57) ABSTRACT

Poling electro-optic polymers on an organically modified sol-gel cladding layer can enhance Pockel's coefficient by up to a factor of 2.5.

21 Claims, 4 Drawing Sheets optical structure 1
\ second metallic electrode 50 poled electro-optic polymer layer 40 cladding layer 30 transparent first metallic electrode 20 substrate 10 a)

b)

(a)

(b)

TECHNIQUE TO ENHANCE THE ELECTRO-OPTIC COEFFICIENT OF POLYMERS BY USING A SOL-GEL CLADDING LAYER TO INCREASE POLING EFFICIENCY

This application claims the priority of provisional U.S. Application No. 60/816,551, filed Jun. 26, 2006, which is incorporated by reference herein in its entirety.

This invention was made with government support under Contract Number DMR0120967 awarded by the National Science Foundation. The government has certain rights in the invention.

This invention was made with government support under Contract Number NRO000-02-C-0600 awarded by the Department of Defense. The government has certain rights in the invention.

BACKGROUND OF THE INVENTION

1. Field of the Invention

The present invention relates to electro-optic materials. In particular, the present invention relates to methods of poling electro-optic polymer materials for use in optical devices.

2. Discussion of the Background

Electro-optic (EO) materials play a key role in optical communication systems, allowing for chirp free high speed modulation. EO properties are exhibited by both inorganic materials and polymers. EO polymers have advantages over inorganic materials with respect to bandwidth, EO activity, cost and processability.

The low dielectric constants of EO polymers allow for extremely high bandwidth devices, as evidenced by reports of EO polymer modulators with bandwidths of more than 100 GHz.

EO polymers with Pockel's coefficients, $r_{33}$, of 262 pm/V have been reported, which may make possible in the near future low-cost, high bandwidth, EO modulators with less than 0.5 V drive voltages and 6 dB insertion loss. Such devices are of interest for analog radio frequency (RF) links, satellite communications and fiber to the home. These EO polymers are also expected to have application in optical packet switching, reconfigurable optical interconnects, wavelength conversion, and terahertz generation, among other areas.

Since EO polymers are soluble in organic solvents, they can be deposited as thin films by spin coating, eliminating the need for single crystal growth techniques. Furthermore, they can be integrated with semiconductor technology without the need for crystal lattice matching.

Most polymers are not electro-optic. To provide electro-optic properties to a polymer, chromophore molecules can be attached in a side-chain fashion to the backbone of a polymer chain. Alternatively, chromophores can be doped into a polymer matrix to provide a guest-host EO polymer.

In order to have a second order optical nonlinearity in a guest-host EO polymer, the electric dipoles in the chromophores need to be oriented in a preferred direction by an electric field in what is known as "poling". Poling can be done by applying a DC voltage at a temperature near the $T_g$ of the host polymer and then cooling the polymer to room temperature with the field still applied to lock in the order to the degree possible by the governing statistical mechanics.

Two common techniques for poling are "contact poling" and "corona poling". In contact poling, voltage is applied directly to metallic electrodes contacting opposite sides of an EO film. In corona poling, a large electric field is applied between a needle positioned above an EO film and a ground plane on the other side of the EO film. The large electric field creates a corona discharge in a gas between the needle and the EO film. Ions build up on the surface of the EO film and create a very strong electric field across the EO film that poles the film.

When used in optical devices, EO polymers are often clad with a variety of materials. It is well known that the choice of cladding layers in poled EO polymer based devices has a major impact on device performance. Sol-gels have been studied extensively as materials for passive waveguide devices. U.S. Pat. Nos. 6,937,811 and 7,206,490 disclose EO waveguide devices that include a poled EO polymer core and, surrounding the core, claddings of polymers or organically modified sol-gels.

To first order, the strength of the EO coefficient, $r_{33}$, resulting from poling is directly proportional to the strength of the applied electric field. Thus, it is important to be able to apply as high an electric field as possible to an EO film during poling.

However, the EO coefficients that can be achieved by poling have been limited by the onset of dielectric breakdown in films.

SUMMARY OF THE INVENTION

The present invention inhibits the onset of dielectric breakdown when poling EO materials by placing the EO materials in contact with a sol-gel cladding material. The sol-gel cladding layer increases the maximum Pockel's coefficient, $r_{33}$, that can be achieved in the poled EO material and offers a simple way to reduce the operating voltage of EO devices by more than 200%. Optical structures in accordance with the present invention can include, in order, a substrate; a transparent first metallic electrode; a cladding layer comprising an organically modified sol-gel; a poled electro-optic polymer layer comprising a poled electro-optic polymer; and a second metallic electrode in direct contact with the poled electro-optic polymer. In addition to increasing $r_{33}$, the sol-gel cladding layer provides refractive index tunability and relatively low optical loss. The organically modified sol-gel cladding layer can act as a resist and be directly patterned lithographically.

BRIEF DESCRIPTION OF THE DRAWINGS

The preferred embodiments of the invention will be described in detail, with reference to the following figures, where.

DETAILED DESCRIPTION OF PREFERRED EMBODIMENTS

The present invention provides an optical structure containing a poled EO polymer on a sol-gel cladding layer. Making the optical structure provides a highly efficient method of poling EO polymers. The optical structure containing a poled EO polymer on a sol-gel cladding layer can be used to fabricate a variety of EO devices.

As used herein, the term "poling" refers to orienting electric dipoles to at least some extent in a material by applying an electric field to the material. A "poled" material refers to a material in which the electric dipoles have, instead of a random orientation, a net orientation or alignment.

In embodiments of the present invention, an EO polymer can contain one or more chromophores. Each chromophore can contain one or more electric dipoles. The chromophores can be chemically bonded to polymer molecules in the EO polymer (e.g., attached to the backbone of a polymer). Alternatively, in a guest-host EO polymer, guest chromophores can be mixed with and dispersed in, preferably uniformly, a host polymer matrix containing one or more polymers.

As discussed above, during poling of a guest-host EO polymer, the polymer is generally heated to a temperature near or above the glass-transition temperature, $T_g$, of the host polymer. At this elevated temperature, the polymer matrix becomes soft and allows for reorientation of the chromophore dipoles. This is done by applying a strong electric field at the elevated temperature that rotates the chromophore dipoles into alignment with the field. Lowering the temperature to room temperature then effectively locks the chromophore dipoles into alignment with the field. When the field is finally removed, the dipoles are held in a metastable alignment. Because thermal fluctuations can misalign the dipoles, a polymer with a high $T_g$ is preferred to maintain dipole alignment during EO device operation.

The EO polymer on the sol-gel cladding can be poled using corona poling or contact poling. Preferably, the EO polymer on the sol-gel cladding is poled using contact poling.

Figure 1:
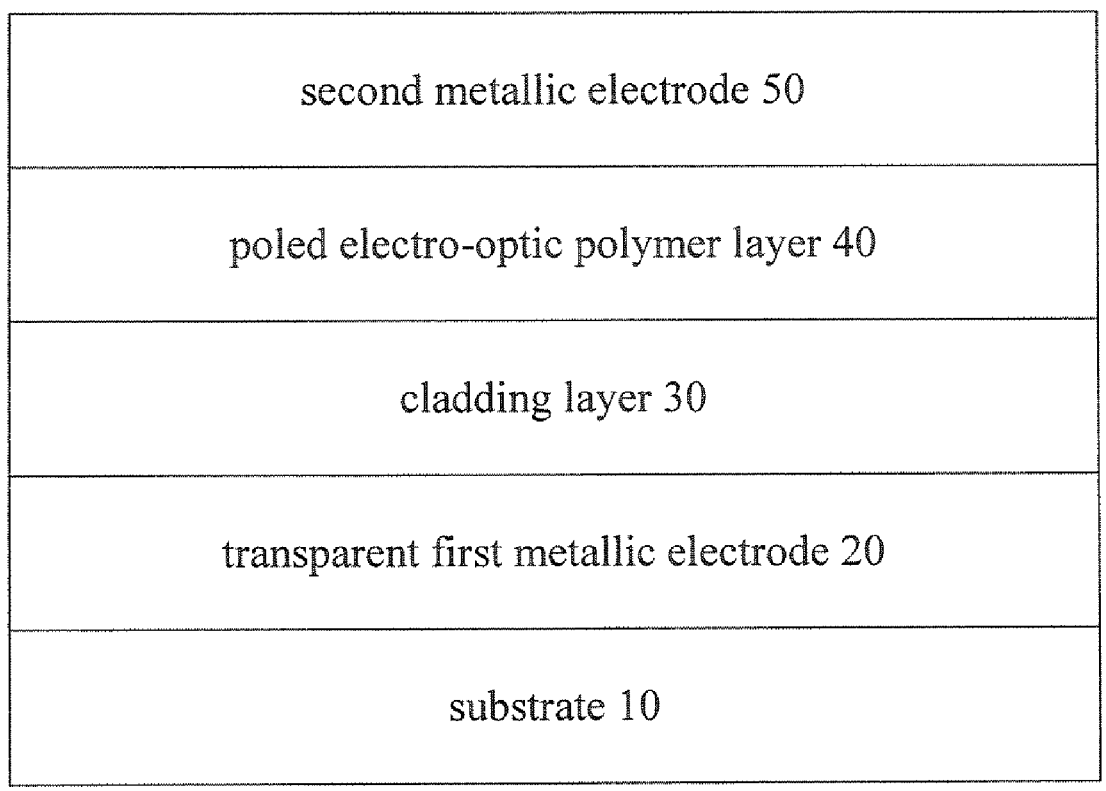
FIG. 1 is a schematic of an optical structure including a poled EO polymer layer.

FIG. 1 shows an optical structure 1 made by contact poling. The optical structure 1 comprises, in order, a substrate 10; a transparent first metallic electrode 20; a cladding layer 30 comprising an organically modified sol-gel; a poled electro-optic polymer layer 40 comprising a poled electro-optic polymer; and a second metallic electrode 50 in direct contact with the poled electro-optic polymer.

The substrate 10 can be a metal, semiconductor or insulator. The substrate 10 can be a glass or a plastic. Preferably, the substrate 10 contains silicon. The substrate 10 can be amorphous or crystalline. Preferably, the substrate 10 is transparent, and has low dielectric loss.

The transparent first metallic electrode 20 is formed on the substrate 10. The transparent first metallic electrode 20 transmits at least 90%, preferably at least 95%, more preferably at least 98%, of light perpendicularly incident on the electrode. The transparent first metallic electrode 20 can be a thin layer of metal. Preferably, the transparent first metallic electrode comprises an oxidized metal. More preferably, the transparent first metallic electrode 20 is indium tin oxide (ITO). The transparent first metallic electrode 20 can be in direct contact with the substrate 10. The transparent first metallic electrode 20 can be formed by vapor deposition techniques known in the art, such as sputtering, chemical vapor deposition and electron beam deposition. The thickness of the transparent first metallic electrode 20 can be in a range of from 1 to 1000 nm, preferably from 10 nm to 500 nm, more preferably from 100 nm to 200 nm.

The cladding layer 30 is formed on, and optionally in direct contact with, the transparent first metallic electrode 20. Preferably, the cladding layer 30 exhibits patternability upon exposure to radiation (e.g., light or electrons); a low optical loss at 1550 nm relative to optical fiber; a tunable refractive index near that of optical fiber (which has n=1.45 at 1550 nm); a low high-frequency dielectric constant; and a high electrical conductivity relative to EO polymer. A cladding material should also be able to withstand temperatures greater than the poling temperature, and be resistant to the organic solvents that the EO polymers are mixed in. These conditions can be met by organically modified sol-gels.

In embodiments, the organically modified sol-gels can contain silicon bonded to oxygen, as in —Si—O—Si— chains. Organic groups bonded to the silicon atoms improve the cladding layer flexibility. The addition of one or more transition metals to a organically modified silicon-containing sol-gel encourages the gelation of the sol and can increase the electrical conductivity of the organically modified sol-gel.

The organically modified sol-gel can be produced by a process comprising hydrolyzing a mixture containing a silicon-containing acrylate and a metal alkoxide; coating the hydrolyzed mixture on the transparent first electrode 20, and curing the coating to form the cladding layer 30.

The silicon-containing acrylate can be a methacrylate. The acrylate promotes the radiation patternability of the sol-gel. Preferably, the silicon-containing acrylate includes 3-(trimethoxysilyl)propyl methacrylate.

The metal alkoxide controls the gelation properties of the sol-gel and can permit the sol to remain a liquid long enough to be spin-coated on the transparent first metallic layer 20. Preferably the metal alkoxide is an alkoxide of at least one transition metal, preferably Zr. The metal alkoxide can contain an alkoxide ion (RO⁻, where R is an organic group) containing from 1 to 10, preferably 2 to 8, more preferably 3 to 6, carbon atoms. The alkoxide ion can be linear or branched. Preferably, the metal alkoxide is zirconium (IV)-n-propoxide.

The index of refraction of the cladding layer 30 can be varied by adjusting the relative amounts of the silicon-containing acrylate and the metal alkoxide in the mixture. The mixture can contain from 70 to 99 mole %, preferably 80 to 98 mole %, more preferably 90 to 97 mole %, of the silicon-containing acrylate and from 1 to 30 mole %, preferably 2 to 20 mole %, more preferably 3 to 10 mole %, of the metal alkoxide.

The hydrolyzed mixture of silicon-containing acrylate and metal alkoxide can be deposited as a film on the transparent first metallic electrode 2 using a variety of techniques know in the art, preferably spin-coating. The film formed by spin-coating can be cured by baking at a temperature in a range of from 100 to 200° C., preferably 120 to 180° C., more preferably 140 to 160° C., for a period of time range from 0.5 to 5 hours, preferably 1 to 4 hours, more preferably 1.5 to 3 hours.

In embodiments, the organically modified sol-gel can contain a 95/5 molar ratio of 3-(trimethoxysilyl)propyl methacrylate to zirconium(IV)-n-propoxide. When cured by exposure to ultraviolet (UV) radiation, this organically modified sol-gel acts as a negative resist (i.e., isopropyl alcohol (IPA) dissolves sol-gel that has not been exposed to UV, but does not dissolve sol-gel that has been cured by exposure to UV).

After curing, by baking or irradiation, the resulting cladding layer 30 can have a thickness in a range of from 0.5 to 10 µm, preferably 1 to 8 µm, more preferably 3 to 6 µm.

The poled EO polymer layer 40 can be formed on, and optionally in direct contact with, the cladding layer 30 by spin-coating at least one EO polymer on the cladding layer 30; baking the spun coating to remove solvent; and then orienting the electric dipoles in the coating using an electric field. The poled EO polymer layer 40 can have a thickness in a range of from 0.5 to 10 µm, preferably 0.7 to 5 µm, more preferably 0.5 to 3 µm.

In embodiments, the EO polymer can include a chromophore covalently bonded to the backbone of a polymer. In other embodiments, the EO polymer can be a guest-host EO polymer, where guest chromophore molecules are dispersed in a host polymer matrix. Preferably, the EO polymer includes one or more of AJ309 cross-linked electro-optic polymer; AJL8, AJLS102, or other high performance guest chromophores doped into an amorphous polycarbonate (APC); and JT1 chromophore doped into a polyimide (PI).

In embodiments of the present invention, the EO polymer can be poled by a contact poling process to produce an optical structure such as that shown in FIG. 1. To produce the structure shown in FIG. 1, a structure is first provided by laminating, in order, a substrate 10, a transparent first metallic electrode 20, a cladding layer 30 comprising an organically modified sol-gel, an EO polymer layer, and a second metallic electrode 50. The poling process then includes heating the EO polymer layer at or above a glass transition temperature, $T_g$, of the EO polymer; applying an electric field between the transparent first metallic electrode 20 and the second metallic electrode 50; poling the EO polymer by aligning the electric dipoles in the EO polymer with the applied electric field; cooling the resulting poled EO polymer layer 40 to room temperature in the applied electric field; and then removing the electric field from the cooled poled EO polymer layer 40.

To stabilize (freeze) electric dipole alignment after poling, $T_g$ is at least 50° C., preferably, at least 100° C., more preferably at least 150° C., higher than room temperature. The electric field can be applied while the EO polymer is at a temperature in a range of from 25 to 225° C., preferably 50 to 200° C., more preferably 75 to 175° C. After poling, the second metallic electrode 50 can be in direct contact with the poled EO polymer in the poled EO polymer layer 40.

The second metallic electrode 50 can include one or more metals, preferably noble metals. In embodiments, the second metallic electrode 50 can contain Au. The second metallic electrode can be formed on the EO polymer by a vapor deposition process, such as sputtering, chemical vapor deposition, or electro-beam evaporation. The second metallic electrode 50 can have a thickness in a range of from 10 to 1000 nm, preferably from 50 nm to 500 nm, more preferably from 100 nm to 200 nm.

During the poling, the organically modified sol-gel in the cladding layer 30 can be in an uncured, but radiation-curable, state; or can be in a cured state as a result of heating or exposure to light or electrons.

So that the electric field applied between the transparent first metallic electrode 20 and the second metallic electrode 50 will drop primarily across the EO polymer, the ratio, at room temperature and/or the poling temperature, of the electrical resistivity of the EO polymer to the electrical resistivity of the cladding layer 30 should be at least 50, preferably at least 100, more preferably at least 150.

The optical structure 1 of the present invention shown in FIG. 1 can be used to produce an optical device in which light passes through the poled EO polymer. For example, the light can pass through the poled EO polymer perpendicular or parallel to a surface of the poled EO polymer layer. If the second metallic electrode 50 is opaque, then the second metallic electrode 50 must be removed during fabrication of the optical device. In the optical devices, the second metallic electrode 50 can be replaced with a transparent polymer or with at least one other transparent metallic electrode.

The invention having been generally described, reference is now made to examples, which are provided herein for purposes of illustration only, and are not intended to be limiting unless otherwise specified.

EXAMPLES

Example 1

The electro-optic coefficients of a control group of samples without a cladding layer were compared to those of group of samples that included a sol-gel cladding layer.

The control group samples were made by spin-coating a 1 µm layer of AJL8/APC polymer (i.e., AJL8 chromophore doped into an amorphous polycarbonate) onto an ITO/glass substrate and then baking at 80° C. for 12 hours in a vacuum oven. A top 100 nm Au electrode was then deposited by electron beam evaporation.

The cladding samples were made by spin coating a 5 µm sol-gel layer of a 95/5 molar ratio of methacryloyloxy propyltrimethoxysilane to zirconium(IV)-n-propoxide onto an ITO/glass substrate and then hard baking at 150° C. for 1.5 hours. A 1 µm AJL8/APC polymer layer was then spin-coated onto the sol-gel layer and baked at 80° C. for 12 hours in a vacuum oven. A top 100 nm Au electrode was then deposited by electron beam evaporation.

The samples were contact poled at a series of voltages for 3 minutes at 150° C. The $r_{33}$ values were then measured using the Teng-Man ellipsometric technique and compared.

In the control group of samples the maximum applied poling voltage before probable dielectric breakdown was 120 V. This poling field resulting in an $r_{33}$ value of 30.7 pm/V. In the cladding samples up to 430 V could be applied before probable dielectric breakdown, and this gave an $r_{33}$ value of 64.5 pm/V. The presence of the cladding material allowed the creation of a much higher poling field in the polymer before dielectric breakdown was reached, leading to an enhancement in $r_{33}$ of 210%.

Example 2

The electro-optic coefficients of samples without a cladding layer were compared to those of samples that included a sol-gel cladding layer.

The sol-gel cladding used in the experiments was a 95/5 molar ratio of 3-(trimethoxysilyl)propyl methacrylate to zirconium(IV)-n-propoxide. The solution was hydrolyzed with 0.1 N HCl and spin coated onto indium tin oxide (ITO)-coated glass substrates and baked at 150° C. for 1.5 hrs. The two guest-host EO polymer systems used were AJL8 chromophore doped into amorphous polycarbonate (APC) and JT1 chromophore doped into a polyimide (PI). The polymers were spin coated onto both ITO glass substrates and sol-gel coated ITO glass substrates to a thickness of 1 µm and baked in a vacuum oven for 12 hrs at 85° C. Gold top electrodes were deposited by electron beam evaporation to a thickness of 100 nm.

Figure 2:
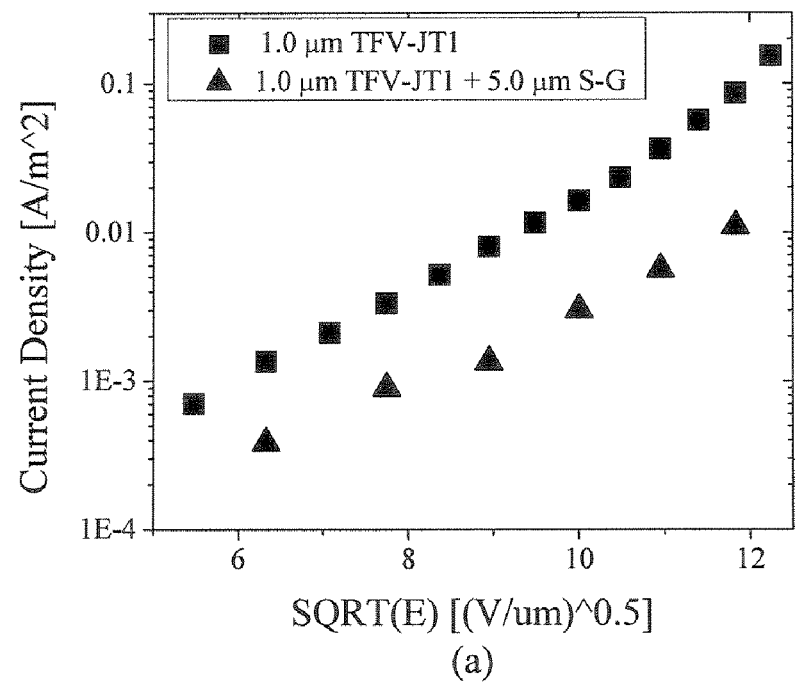
FIG. 2 shows in (a) current density as a function of the square root of the applied electric field for a JT1 chromophore doped in polyimide with and without a 5 micron sol-gel (S-G) cladding, and shows in (b) current density as a function of applied electric field for sol-gel, with the inset showing the slow current decay as a function of time, attributed to trapping.
Figure 2:
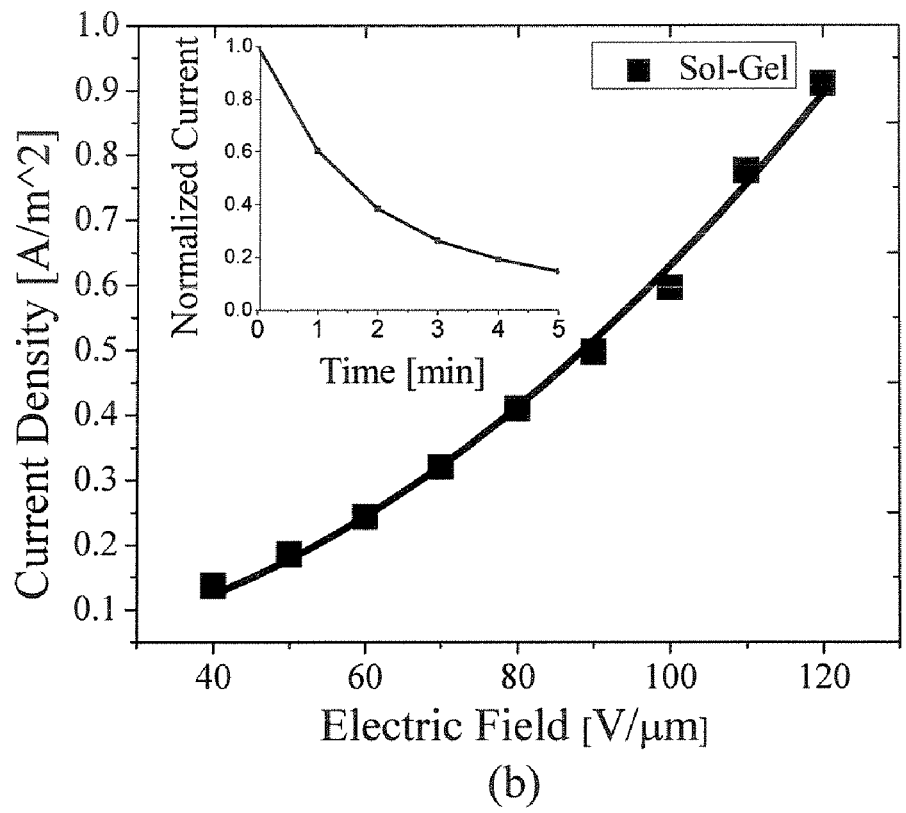

In order to obtain an estimate of the fraction of the total applied voltage dropped across the EO polymer layer, current density was measured as a function of applied electric field at the poling temperature of 150° C. for both the control group samples (with EO polymer layer) and the cladding samples (with EO polymer layer and sol-gel layer). FIG. 2a shows current density as a function of the square root of the applied electric field for JT1 in PI with and without a 5 micron sol-gel (S-G) cladding. It is assumed that 100% of the applied voltage is dropped across the polymer in both cases. FIG. 2b shows current density as a function of applied electric field for sol-gel with the inset showing the slow current decay as a function of time, which is attributed to trapping. Both were measured at the poling temp of 150° C.

The current-voltage characteristics of the sol-gel and EO polymers do not obey simple ohmic relationships. The measured current density as a function of the applied electric field for the relevant EO polymers was found to follow the Schottky-Richardson theory of thermionic emission across a potential barrier:

$$i = \frac{4\pi em(kT)^2}{h^3} \exp\left(-\frac{\phi - \beta_s\sqrt{E}}{kT}\right), \quad (1)$$

Where T is the temperature, $\phi$ the potential barrier height, E the electric field and $\beta_s = (e^3/4\pi\epsilon_r\epsilon_0)^{1/2}$ is the Schottky coefficient. The measured charge density as a function of the applied electric field for the sol-gel cladding was found to follow the Mott and Gurney relationship for trap-free space charge limited currents:

$$i = \frac{9}{8}\epsilon\mu_n\frac{V^2}{d^3}, \quad (2)$$

where $\epsilon$ is the dielectric constant, $\mu$ the charge mobility, V the applied voltage and d the material thickness. However, a current decay was observed (FIG. 2b) on a extended time scale on the order of minutes, which appears to be related to charge trapping within the sol-gel layer. The slow trapping may be a result of the desorption of water molecules from the sol-gel.

Figure 3:
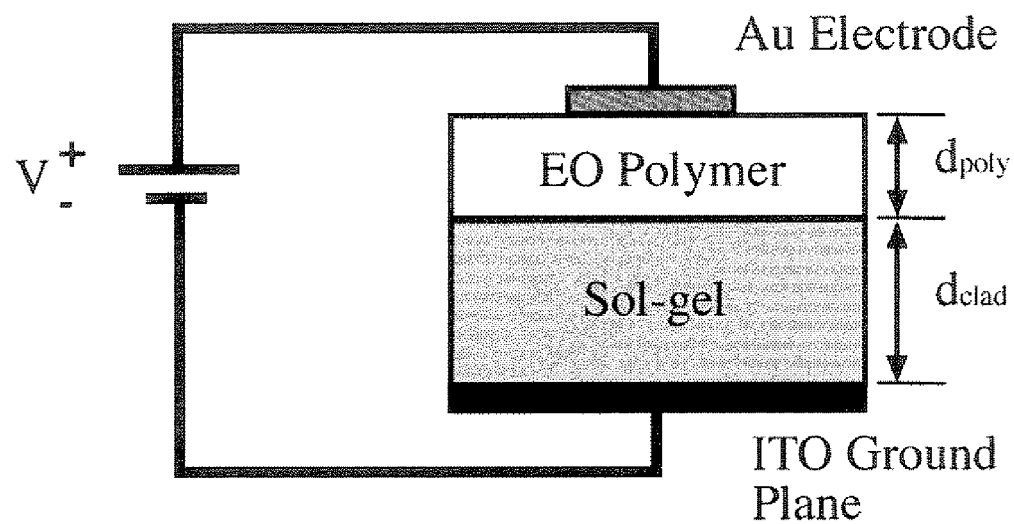
FIG. 3 shows in (a) a multi-layer structure fabricated to test poling efficiency in a hybrid sol-gel/EO polymer modulator, and shows in (b) a single layer polymer film poled and tested as a control sample.
Figure 3:
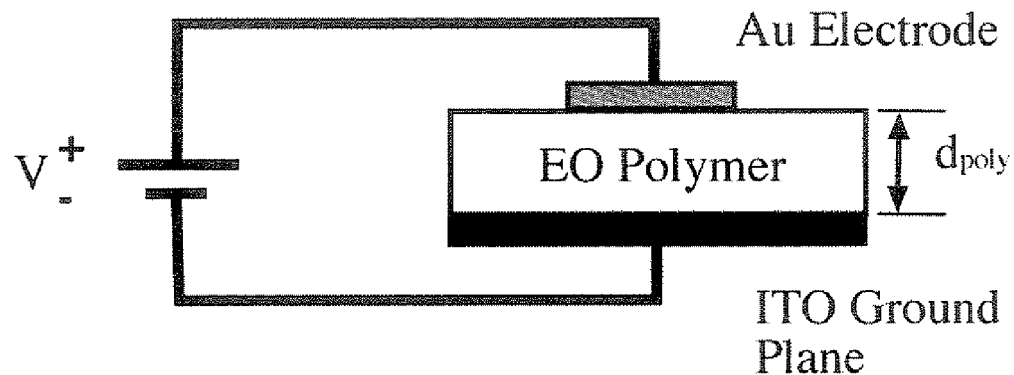

To test poling efficiency in a hybrid sol-gel/EO polymer modulator, two-layer EO polymer/sol-gel cladding samples as shown in FIG. 3a were then poled, along with, as a control, simple one layer EO polymer samples as shown in FIG. 3b. Their $r_{33}$ values were measured using the ellipsometric reflection technique. When using this technique to measure $r_{33}$ of multilayer films it is important to correct for the partial voltage drop across the cladding layer. When an AC voltage is applied at room temperature the multilayer stack behaves as two capacitors in series. Assuming the cladding material to be nonmagnetic and that the electrodes form a lossless transmission line, the portion of the total voltage, $V_{AC}$, dropped across the EO polymer is given by:

$$V_{poly} = V_{AC} \cdot \frac{d_{poly}}{d_{poly} + d_{clad}} \cdot \sqrt{\frac{\epsilon_{clad}}{\epsilon_{poly}}}, \quad (3)$$

where $\epsilon_{clad}$ and $\epsilon_{poly}$ are the relative dielectric constants of the sol-gel cladding and active EO polymer, $d_{poly}$ and $d_{clad}$ are the thicknesses of the EO polymer and sol-gel cladding, respectively. The relative dielectric constant of the sol-gel cladding was measured to be 5.0 for the sol-gel cladding, 3.5 for AJL8 in APC, and 3.4 for JT1 in PI at the measurement frequency of 1 kHz. The standard equation for $r_{33}$ using the ellipsometric method becomes:

$$r_{33} = \frac{3\lambda I_m}{4\pi V_{AC} I_c n^2} \cdot \frac{\sqrt{n^2 - \sin^2\theta}}{\sin^2\theta} \cdot \frac{d_{poly} + d_{clad}}{d_{poly}} \sqrt{\frac{\epsilon_{poly}}{\epsilon_{clad}}}, \quad (4)$$

where $\theta$ is the measurement angle.

Figure 4:
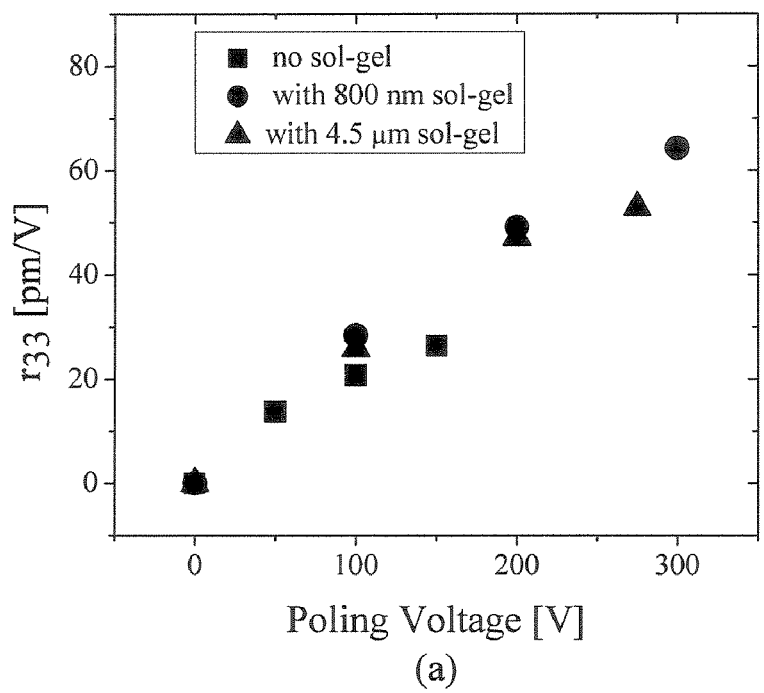
FIG. 4 shows in (a) $r_{33}$, for JT1 chromophore doped in polyimide, as a function of poling voltage for structures with and without a sol-gel cladding layer, and shows in (b) $r_{33}$, for AJL8 chromophore doped in amorphous polycarbonate, as a function of poling voltage for structures with and without a sol-gel cladding layer.
Figure 4:
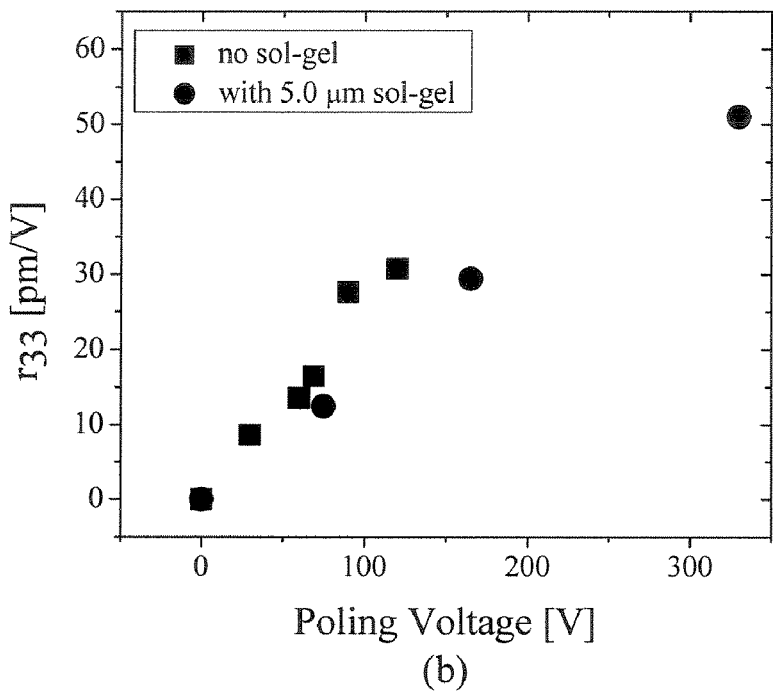

FIGS. 4a and 4b show the variation in $r_{33}$ with poling voltage for the EO polymer/sol-gel cladding samples and for the control samples with no sol-gel cladding. FIGS. 4a and 4b show that poling was possible at a much higher voltage before reaching dielectric breakdown when the sol-gel cladding layer was present. FIGS. 4a and 4b also show that the poling slope efficiency, $dr_{33}/dV$, remained nearly constant with and without the presence of a sol-gel cladding. Thus, it is postulated that nearly the entire applied DC poling voltage is dropped across the EO polymer. Therefore the sol-gel cladding can be assumed to have a much larger conductivity than the EO polymer layers at the poling temperature.

In particular, FIG. 4a compares the poling voltage dependence of $r_{33}$, for JT1 chromophore doped in polyimide (PI), in devices using a sol-gel cladding layer against a device using no sol-gel cladding layer. These devices could be poled up to an applied voltage of 300 V with a 1 µm JT1/PI polymer layer on top of an 800 nm thick sol-gel cladding, resulting in an $r_{33}$ value of 64 pm/V. When a 4.5 µm thick sol-gel cladding was used, poling could be applied up to 270 V resulting, in an $r_{33}$ value of 53 pm/V. In contrast, in a device with only a single 1 µm layer film of JT1/PI and no sol-gel cladding layer, poling could be applied only up to 150 V before dielectric breakdown, giving a maximum $r_{33}$ of 26 pm/V. Thus, the presence of the sol-gel cladding enhanced the maximum $r_{33}$ value in the JT1/PI polymer by a factor of 2.5.

FIG. 4b compares the poling voltage dependence of $r_{33}$, for AJL8 chromophore doped in amorphous polycarbonate (APC), in a device using a sol-gel cladding layer against a device using no sol-gel cladding layer. These devices could be poled up to an applied voltage of 330 V with a 1 nm AJL8/APC polymer layer on top of a 4.5 µm sol-gel layer before reaching dielectric breakdown, resulting in a maximum $r_{33}$ value of 51 pm/V. In contrast, a device with only a single 1 µm layer of EO polymer and no cladding layer could support only 130 V before dielectric breakdown occurred, resulting in a maximum $r_{33}$ value of 31 pm/V. Thus, the presence of the sol-gel cladding enhanced the maximum $r_{33}$ value in AJL8/APC polymer by a factor of 1.64.

The mechanism behind the enhancement in $r_{33}$ through the use of a sol-gel cladding layer during poling is not entirely clear. It is hypothesized that the sol-gel cladding layer may act as a buffer between the EO polymer and the ground electrode which hinders the passage of free electrons that can seed dielectric breakdown in the EO polymer.

The disclosure herein of a numerical range is intended to be the disclosure of the endpoints of that numerical range and of every number within that numerical range.

While the present invention has been described with respect to specific embodiments, it is not confined to the specific details set forth, but includes various changes and modifications that may suggest themselves to those skilled in the art, all falling within the scope of the invention as defined by the following claims.

What is claimed is:

1. An optical structure comprising
a substrate;
a transparent first metallic electrode laminated on the substrate;
a cladding layer comprising an organically modified sol-gel laminated on the transparent first metallic electrode;
a poled electro-optic polymer layer comprising at least one poled electro-optic polymer laminated on the cladding layer; and
a second metallic electrode in direct contact with the at least one poled electro-optic polymer.

2. The optical structure according to claim 1, wherein the substrate is transparent.

3. The optical structure according to claim 1, wherein the substrate comprises a glass.

4. The optical structure according to claim 1, wherein the substrate comprises silicon.

5. The optical structure according to claim 1, wherein the transparent first metallic electrode comprises an oxidized metal.

6. The optical structure according to claim 1, wherein the transparent first metallic electrode comprises indium tin oxide.

7. The optical structure according to claim 1, wherein the organically modified sol-gel is produced by a process comprising hydrolyzing a mixture containing a silicon-containing acrylate and a metal alkoxide.

8. The optical structure according to claim 7, wherein
the silicon-containing acrylate comprises 3-(trimethoxysilyl)propyl methacrylate; and
the metal alkoxide comprises zirconium(IV)-n-propoxide.

9. The optical structure according to claim 1, wherein the organically modified sol-gel is radiation-curable.

10. The optical structure according to claim 1, wherein the organically modified sol-gel has been cured with radiation.

11. The optical structure according to claim 1, wherein the at least one poled electro-optic polymer comprises at least one electro-optic molecule dispersed in a polymer matrix.

12. The optical structure according to claim 1, wherein the at least one poled electro-optic polymer comprises a member selected from the group consisting of
AJL8 chromophore doped into an amorphous polycarbonate
AJLS102 chromophore doped into an amorphous polycarbonate,
AJ309 cross-linked electro-optic polymer, and
JT1 chromophore doped into a polyimide.

13. The optical structure according to claim 1, wherein the second metallic electrode comprises at least one noble metal.

14. A method of making an optical structure, the method comprising laminating, in order,
a substrate,
a transparent first metallic electrode,
a cladding layer comprising an organically modified sol-gel,
an electro-optic polymer layer comprising at least one electro-optic polymer, and
a second metallic electrode in direct contact with the at least one electro-optic polymer;
applying an electrical field between the transparent first metallic electrode and the second metallic electrode to pole the electro-optic polymer layer; and
producing an optical structure comprising
the substrate,
the transparent first metallic electrode laminated on the substrate,
the cladding layer comprising an organically modified sol-gel laminated on the transparent first metallic electrode,
a poled electro-optic polymer layer comprising at least one poled electro-optic polymer laminated on the cladding layer, and
the second metallic electrode in direct contact with the at least one poled electro-optic polymer.

15. The method according to claim 14, wherein the electrical field is applied while the electro-optic polymer layer is at a temperature above a glass transition temperature of the at least one electro-optic polymer.

16. The method according to claim 14, wherein the electrical field is applied while the electro-optic polymer layer is at a temperature in a range of from 25° C. to 225° C.

17. The method according to claim 14, wherein the laminating comprises spin-coating on the transparent first metallic electrode a hydrolyzed mixture containing a silicon-containing acrylate and a metal alkoxide.

18. The method according to claim 17, wherein
the silicon-containing acrylate comprises 3-(trimethoxysilyl)propyl methacrylate; and
the metal alkoxide comprises zirconium(IV)-n-propoxide.

19. The method according to claim 14, wherein the laminating comprises spin-coating on the cladding layer the at least one electro-optic polymer.

20. The method according to claim 14, wherein the at least one electro-optic polymer is selected from the group consisting of
AJL8 chromophore doped into an amorphous polycarbonate
AJLS102 chromophore doped into an amorphous polycarbonate,
AJ309 cross-linked electro-optic polymer, and
JT1 chromophore doped into a polyimide.

21. A method of using an optical structure, the method comprising
providing an optical structure comprising
a substrate,
a transparent first metallic electrode laminated on the substrate,
a cladding layer comprising an organically modified sol-gel laminated on the transparent first metallic electrode,
a poled electro-optic polymer layer comprising at least one poled electro-optic polymer laminated on the cladding layer, and
a second metallic electrode in direct contact with the at least one poled electro-optic polymer;
removing the second metallic electrode from the poled electro-optic polymer layer; and
passing light through the at least one poled electro-optic polymer.

* * * * *